(12) United States Patent
Ansari et al.

(10) Patent No.: US 9,804,623 B2
(45) Date of Patent: Oct. 31, 2017

(54) DECENTRALIZED CONTROLS AND COMMUNICATIONS FOR AUTONOMOUS DISTRIBUTION NETWORKS IN SMART GRID

(71) Applicant: New Jersey Institute of Technology, Newark, NJ (US)

(72) Inventors: Nirwan Ansari, Montville, NJ (US); Chun-Hao Lo, Riverdale, NJ (US)

(73) Assignee: NEW JERSEY INSTITUTE OF TECHNOLOGY, Newark, NJ (US)

( * ) Notice: Subject to any disclaimer, the term of this patent is extended or adjusted under 35 U.S.C. 154(b) by 742 days.

(21) Appl. No.: 14/342,191

(22) PCT Filed: Oct. 10, 2012

(86) PCT No.: PCT/IB2012/003134
§ 371 (c)(1),
(2) Date: Feb. 28, 2014

(87) PCT Pub. No.: WO2014/057304
PCT Pub. Date: Apr. 17, 2014

(65) Prior Publication Data
US 2014/0249688 A1   Sep. 4, 2014

(51) Int. Cl.
*G05F 1/66* (2006.01)
*G06Q 50/06* (2012.01)
(Continued)

(52) U.S. Cl.
CPC .............. *G05F 1/66* (2013.01); *H02J 3/24* (2013.01); *H02J 3/381* (2013.01); *H02J 3/46* (2013.01);
(Continued)

(58) Field of Classification Search
CPC ...... G05F 1/66; H02J 3/24; H02J 3/381; H02J 3/46; H02J 13/0013; G06Q 10/04; G06Q 50/06; G06F 1/26
See application file for complete search history.

(56) References Cited

U.S. PATENT DOCUMENTS

| | | | |
|---|---|---|---|
| 7,958,183 B2* | 6/2011 | Arimilli | G06F 15/17381 709/201 |
| 7,983,799 B2* | 7/2011 | Bose | H02J 3/06 700/287 |

(Continued)

FOREIGN PATENT DOCUMENTS

WO   2012008979 A2   1/2012

OTHER PUBLICATIONS

Kremers, "A Complex Systems Modelling Approach for Decentralised Simulation of Electrical Microgrids", ICECCS, 2010 15th IEEE International Conference, Mar. 22-26, 2010, DOI 10.1109/ICECCS.2010.1.*

(Continued)

*Primary Examiner* — Sean Shechtman
*Assistant Examiner* — Michael W Choi
(74) *Attorney, Agent, or Firm* — Turk IP Law, LLC

(57) ABSTRACT

Technologies are generally described for addressing the bidirectional power flow conflict incurred by power surpluses produced from a number of households' on-location energy generation units (e.g., solar) in power distribution networks. A micro grid composed of households in a neighborhood may be considered as a generating- or consuming-resource entity at different time periods. The approach may be formulated as a power balance computation such that power balance may not be achieved within the micro grid itself, and therefore power sharing (or redispatching) among micro grids is operated, before requesting power from the macro grid, i.e., the fuel-based conventional grid. Enhancement of renewable energy utilization and reduction in the amount of data packet traffic in exchange of information and (Continued)

control messages via uplink and downlink transmissions throughout an overlay multi-tier communications network infrastructure may be taken into consideration in example implementations.

23 Claims, 7 Drawing Sheets

(51) Int. Cl.
 H02J 3/46 (2006.01)
 H02J 3/24 (2006.01)
 H02J 3/38 (2006.01)
 H02J 13/00 (2006.01)
 G06Q 10/04 (2012.01)

(52) U.S. Cl.
 CPC .......... *H02J 13/0013* (2013.01); *G06Q 10/04* (2013.01); *G06Q 50/06* (2013.01); *H02J 13/0065* (2013.01); *H02J 13/0075* (2013.01); *Y02B 70/3216* (2013.01); *Y02B 70/3266* (2013.01); *Y02B 90/2607* (2013.01); *Y02B 90/2653* (2013.01); *Y02E 40/72* (2013.01); *Y04S 10/12* (2013.01); *Y04S 20/221* (2013.01); *Y04S 20/242* (2013.01); *Y04S 40/12* (2013.01); *Y04S 40/126* (2013.01)

(56) References Cited

U.S. PATENT DOCUMENTS

| | | | | |
|---|---|---|---|---|
| 9,172,738 B1* | 10/2015 | daCosta | ............... | H04L 67/00 |
| 2006/0171329 A1* | 8/2006 | Ying | ............... | H02J 13/0062 370/254 |
| 2008/0272934 A1* | 11/2008 | Wang | ............... | H02J 3/14 340/870.11 |
| 2010/0332373 A1* | 12/2010 | Crabtree | ............... | G06Q 50/06 705/37 |
| 2011/0106321 A1* | 5/2011 | Cherian | ............... | H02J 3/00 700/286 |
| 2011/0231028 A1* | 9/2011 | Ozog | ............... | G06Q 10/06 700/291 |
| 2011/0248569 A1* | 10/2011 | Son | ............... | H02J 3/381 307/87 |
| 2012/0029720 A1* | 2/2012 | Cherian | ............... | H02J 13/00 700/297 |
| 2012/0143385 A1* | 6/2012 | Goldsmith | ............... | H02J 3/38 700/297 |
| 2012/0310559 A1* | 12/2012 | Taft | ............... | H02J 13/0013 702/62 |
| 2012/0316689 A1* | 12/2012 | Boardman | ............... | H02J 13/0079 700/292 |
| 2012/0316696 A1* | 12/2012 | Boardman | ............... | H02J 13/0086 700/297 |
| 2013/0015703 A1* | 1/2013 | Rouse | ............... | H02J 3/38 307/18 |

OTHER PUBLICATIONS

Cui, "Measuring Data Abstraction Quality in Multiresolution Visualization", IEEE TVCG, vol. 12, Issue 5, Sep.-Oct. 2006, DOI 10.1109/TVCG.2006.161.*

Nasari, "Enhancement Energy Efficient TDMA Wake Up MAC Protocol by Clustering for Wireless Sensor Networks", icac3 '09 Proceedings of the International Conference on Advances in Computing, Communication and Control, pp. 81-85, 2009, doi 10.1145/1523103.1523121.*

"Volt and Var Control and Optimization," Smart Distribution Wiki, accessed at http://wiki.powerdistributionresearch.com/index.php?title=Volt_and_Var_Control_and_Optimisation, last modified on Mar. 1, 2011, pp. 1-7.

Akella, R. et al. "Distributed Power Balancing for the FREEDM System" IEEE International Conference on Smart Grid Communication (SmartGridComm), pp. 7-12, Oct. 2010.

Alvarez-Herault, M-C., et al., "A Novel Hybrid Network Architecture to Increase DG Insertion in Electrical Distribution Systems," IEEE Transaction on Power Systems, vol. 26, Issue 2, pp. 905-914 (2011).

Bouhafs, F., et al., "Links to the future: Communication Requirements and Challenges in the Smart Grid," IEEE Power and Energy Magazine, vol. 10, Issue 1, pp. 24-32 (2012).

Cai, Z. et al, "A Secure and Distributed Control Network for the Communications in Smart Grid" 2011 IEEE International Conference on Systems, Man and Cybernetics, pp. 2652-2657, Oct. 12, 2011.

Kim, Y-J., et al., "A Secure Decentralized Data-centric Information Infrastructure for Smart Grid," IEEE Communications Magazine, vol. 48, No. 11, pp. 58-65, Nov. 2010.

Kobayashi, H., and Hatta, H., "Reactive power control method between DG using ICT for proper voltage control of utility distribution system," IEEE Power and Energy Society General Meeting, pp. 1-6, Jul. 2011.

Lasseter, R.H., "Smart Distribution: Coupled Microgrids," Proceedings of the IEEE, vol. 99, Issue. 6, pp. 1074-1082 (2011).

Li, J., "Reconfiguration of power networks based on graph-theoretic algorithms" Iowa State University, Graduate Theses and Dissertations, Paper 11671, pp. 93 (2010).

Lo, C-H., and Ansari, N., "Alleviating Solar Energy Congestion in the Distribution Grid via Smart Metering Communications," IEEE Transaction on Parallel and Distributed Systems, vol. 23, Issue 9, pp. 1607-1620 (2012).

Madawala, U.K., et al., "A power-Frequency Controller for Bidirectional Inductive Power Transfer Systems," IEEE Transaction on Industrial Electronics, vol. 60, Issue 1, pp. 310-317 (2013).

Mahmud, M., et al., "Voltage control of distribution networks with distributed generation using reactive power compensation," 37th Annual Conf. on IEEE Industrial Electronics Society (IECON), pp. 985-990 (2011).

Nguyen, P.H., et al., "Distributed routing algorithms to manage power flow in agent-based active distribution network," IEEE PES Innovative Smart Grid Technologies Conference Europe (ISGT Europe), pp. 1-7, Oct. 11-13, 2010.

Nguyen, P.H., et al., "Power Flow Management in Active Networks," IEEE Bucharest Power Tech, pp. 1-6, Jun. 28, 2009-Jul. 2, 2009.

Overbeeke, F.V., "Active networks: Distribution networks facilitating integration of distributed generation," 2nd International Symposium on Distributed Generation, vol. 1, pp. 315-318 (2002).

International Search Report and Written Opinion for Application No. PCT/IB2012/003134 mailed on Nov. 27, 2013.

* cited by examiner

COMPUTER PROGRAM PRODUCT 700

SIGNAL-BEARING MEDIUM 702

704 AT LEAST ONE OF

ONE OR MORE INSTRUCTIONS FOR STRUCTURING A PORTION OF THE SMART GRID IN A FOUR TIERED ARCHITECTURE;
    ONE OR MORE INSTRUCTIONS FOR ENABLING EXCHANGE OF POWER AVAILABILITY AND/OR NEED INFORMATION AMONG THE HOUSEHOLDS, THE MGS, AND THE CCS THROUGH UPLINK AND DOWNLINK COMMUNICATIONS;
    ONE OR MORE INSTRUCTIONS FOR ENABLING DIRECT DISTRIBUTION OF EXCESS POWER AMONG THE MGS AND SUBSYSTEMS;
    ONE OR MORE INSTRUCTIONS FOR FORMING A CONNECTED, UNDIRECTED TREE GRAPH BASED ON THE FOUR TIERED ARCHITECTURE; AND/OR
    ONE OR MORE INSTRUCTIONS FOR COMPUTING POWER FLOW VALUES FOR EACH EDGE OF THE GRAPH TREE BASED ON SURPLUS OR NEEDED POWER OF EACH NODE AND PARENT-CHILD RELATIONSHIP OF EACH NODE.

| COMPUTER-READABLE MEDIUM 706 | RECORDABLE MEDIUM 708 | COMMUNICATIONS MEDIUM 710 |

FIG. 7

DECENTRALIZED CONTROLS AND COMMUNICATIONS FOR AUTONOMOUS DISTRIBUTION NETWORKS IN SMART GRID

CROSS-REFERENCE TO RELATED APPLICATION

This Application is the U.S. National Stage filing under 35 U.S.C §371 of International Application No. PCT/IB12/003134, filed on Oct. 10, 2012. International Application No. PCT/IB12/003134 is herein incorporated by reference in its entirety.

BACKGROUND

Escalating power consumption and greenhouse gas emissions worldwide have drawn attention to the consolidation of smart grid paradigms and concepts. Researchers in various fields are called to collaboratively develop innovative designs to modernize the existing electric power system which has lasted for decades. Occurrence of peak-loads as well as a rise in fuel costs has encouraged the implementation of distributed generation towards the end-use sectors in the distribution system. Due to advances in semiconductors and technology maturity in hardware and software, many challenges that were difficult to overcome over a century ago have now become possible to enhance the overall power system operations and the quality of life.

Traditional power congestion as a consequence of rising energy generation and consumption (or loads) in the legacy electric power grid has encouraged utilities to implement distributed energy resource (DER) units throughout the medium- and low-voltage distribution networks. Renewable-based distributed energy generation supporting local loads (e.g., households implemented with photo-voltaic solar systems) may reduce power losses and improve reliability. However, the approach may result in bidirectional power flow due to power surpluses, and at the same time the intermittency of renewable energy production may cause the existing operations to be more challenging. The balance of power (i.e., power generation and loads to be balanced) is typically focused from centralized operations to decentralized coordination that emphasizes a desire for distribution automation in active control and management.

SUMMARY

The present disclosure generally describes methods, apparatus, systems, devices, and/or computer program products related to decentralized controls and communications for autonomous distribution networks in a smart grid.

According to some example embodiments, various methods for facilitating decentralized controls and communications for autonomous distribution networks in a smart grid are described. Example methods may include structuring at least a portion of the smart grid in a four tiered architecture, where a first tier comprises a central control center (CCC) managing a plurality of Distribution Control Centers (DCCs) each DCC representing an Autonomous Distribution Network (ADN), a second tier comprises a plurality of first Control Centers (CCs) each CC representing a subsystem, a third tier comprises a plurality of second CCs each second CC representing neighborhood or a field area network, and a fourth tier comprises a plurality of micro grids (MGs) each MG comprising one or more households and each MG being managed by a second CC in the third tier. The example methods may also include enabling exchange of power availability and/or need information among the households, the MGs, and the CCs through uplink and downlink communications; and enabling direct distribution of excess power among the MGs and subsystems.

According to other example embodiments, a smart power distribution network configured to facilitate decentralized controls and communications for autonomous distribution networks is described. An example network may include a first tier that comprises a central control center (CCC) managing a plurality of Distribution Control Centers (DCCs) each DCC representing an Authnomous Distribution Network (ADN); a second tier that comprises a plurality of first Control Centers (CCs) each CC representing a subsystem; a third tier that comprises a plurality of second CCs each second CC representing neighborhood or a field area network; and/or a fourth tier that comprises a plurality of micro grids (MGs) each MG comprising one or more households and each MG being managed by a second CC in the third tier. The network may enable exchange of power availability and/or need information among the households, the MGs, and the CCs through uplink and downlink communications, and direct distribution of excess power among the MGs and subsystems.

According to further example embodiments, a computer readable storage medium with instructions stored thereon for executing a method at one or more processors for facilitating decentralized controls and communications for autonomous distribution networks in a smart grid is described. The instructions may include structuring at least a portion of the smart grid in a four tiered architecture, where a first tier comprises a central control center (CCC) managing a plurality of Distribution Control Centers (DCCs) each DCC representing an Autonomous Distribution Network (ADN), a second tier comprises a plurality of first Control Centers (CCs) each CC representing a subsystem, a third tier comprises a plurality of second CCs each second CC representing neighborhood or a field area network, and a fourth tier comprises a plurality of micro grids (MGs) each MG comprising one or more households and each MG being managed by a second CC in the third tier. The example instructions may also include enabling exchange of power availability and/or need information among the households, the MGs, and the CCs through uplink and downlink communications; and enabling direct distribution of excess power among the MGs and subsystems.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and arc, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein.

DETAILED DESCRIPTION

Figure 1:
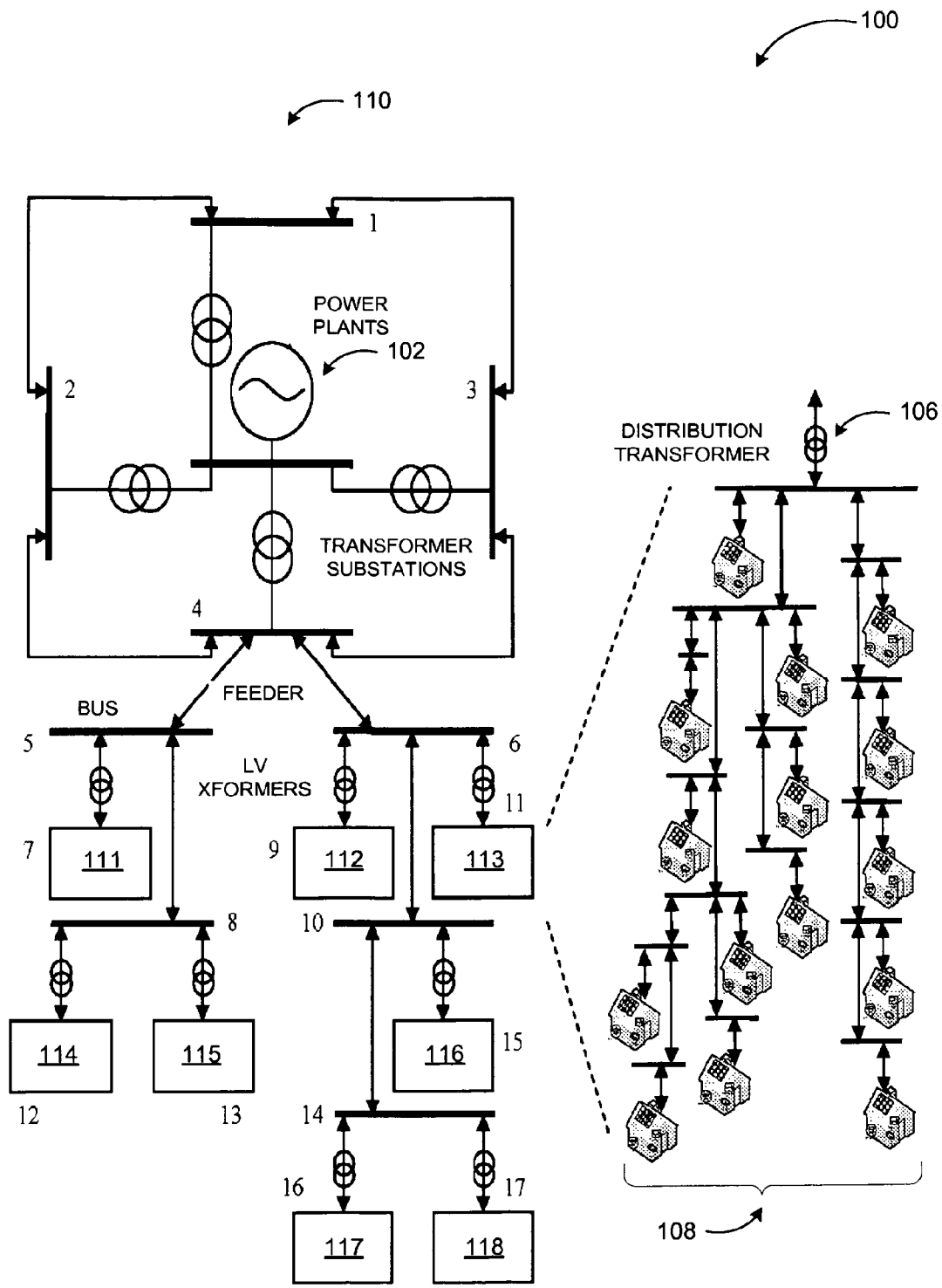
FIG. 1 illustrates a systematic model of a power distribution system and associated residential network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alfa, to methods, apparatus, systems, devices, and/or computer program products related to decentralized controls and communications for autonomous distribution networks in a smart grid.

Briefly stated, technologies are generally provided for addressing the bidirectional power flow conflict incurred by power surpluses produced from a number of households' on-location energy generation units (e.g., solar) in power distribution networks. A micro grid composed of households in a neighborhood may be considered as a generating- or consuming-resource entity at different time periods. The approach may be formulated as a power balance computation such that power balance may not be achieved within the micro grid itself, and therefore power sharing (or redispatching) among micro grids is operated, before requesting power from the macro grid, i.e., the fuel-based conventional grid. Enhancement of renewable energy utilization and reduction in the amount of data packet traffic in exchange of information and control messages via uplink and downlink transmissions throughout an overlay multi-tier communications network infrastructure may be taken into consideration in example implementations.

FIG. 1 illustrates a systematic model of a power distribution system and associated residential network, arranged in accordance with at least some embodiments described herein.

A system according to some example embodiments may include three major components: (1) an active autonomous distribution network (ADN) supervised by distribution system operators that monitors and controls PV generation and households' loads to utilize renewable energy whenever possible while considering no energy storage in the distribution system; (2) associated overlay communications network infrastructure (OCNI), which may be hierarchically subdivided into multiple tiers: micro grids, neighborhood/field area networks (N/FAN), subsystems, and cluster where the corresponding control centers coordinate power flow between two tiers, respectively; and (3) a computation approach (control of power flow direction "COPE"), for managing power flow to increase renewable energy utilization. The OCNI along with COPE for the underlying ADNs may facilitate both power and communications management efficiently.

The existing electric power grid is constructed under a radial tree-like topology. Thus, a distribution system model according to embodiments may be considered as exhibiting such structure characteristics. The systematic model in diagram 100 includes five major components: power source 102 in the macro grid 110; nine buses throughout the distribution system, (buses 1-6, 8, 10, 14); four distribution networks (one connected to bus 4 is shown for example purposes); eight neighborhoods or residential networks in each distribution network (blocks 111 through 118); and fifteen households 108 in each neighborhood or residential network connected through distribution transformer 106. For simplicity, it may be assumed that other distribution networks which are connected to Bus 1-3 have the same grid structure with the one connected to Bus 4.

Each distribution network may be determined as a cluster, $\{c_1, c_2, \ldots, c_s\} \in C$, $c_1 \cap c_2 \cap \ldots \cap c_s = \emptyset$ (i.e., distribution networks are independent), and cluster $c_i$, $i=1, 2, \ldots, s$, may be grouped into subsystems, $\{g_1, g_2 \ldots g_k\} \in c$, $\forall c \in C$, where $g_1 \cap g_2 \cap \ldots \cap g_k = \emptyset$, i.e., groups are non-overlapping. Each subsystem (or group) $g_i$, $i=1, 2, \ldots, k$, may be composed of multiple micro grids (MGs), $\{h_1, h_2, \ldots, h_j\} \in g$, $\forall g \in c$, where $h_1 \cap h_2 \cap \ldots h_j = \emptyset$, i.e., MGs are non-overlapping. Distribution buses and residential networks may be represented as nodes by using graph theory in order to analyze the system model.

Figure 2:
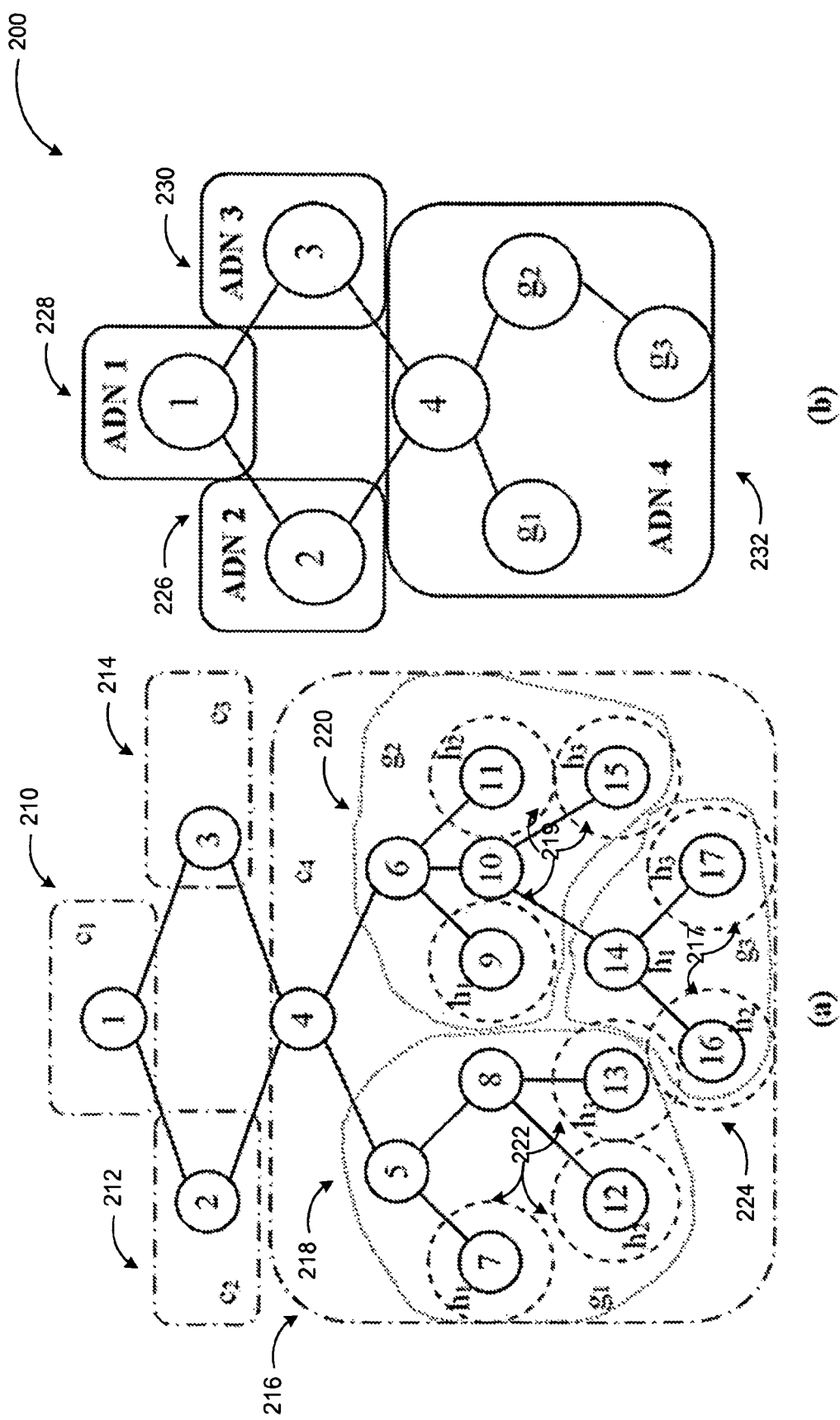
FIG. 2 illustrates a connected, undirected graph interpreting the distribution system model in FIG. 1 (a) and contraction of its graph and formation of ADNs (b)

FIG. 2 illustrates a connected, undirected graph interpreting the distribution system model in FIG. 1 (a) and contraction of its graph and formation of Autonomous Distribution Networks (ADNs) (b), arranged in accordance with at least some embodiments described herein.

Part (a) of diagram 200 showing an connected, undirected graph interpreting the distribution system model in FIG. 1 includes a total number of seventeen nodes connected with lines (distribution feeders) projecting from the systematic model in diagram 100. In the illustrated example, there are four clusters (s=|C|=4 where |•| represents the cardinality), node 7, 12, 13 (corresponding to $h_1, h_2, h_3$ 222) may be merged into group $g_1$ 218; node 9, 11, 15 (corresponding to $h_1, h_2, h_3$ 219) may be merged into group $g_2$ 220; and node 16, 17 (corresponding to $h_1, h_2$ 217) may be merged into group $g_3$ 224. The group approach may consider network balancing. in terms of scalability such that each MG is composed of the same number of households and each group has the same number of MGs as much as possible, according to some examples.

Part (b) of diagram 200 illustrating a contraction of the graph and formation of ADNs 226, 228, 230, and 232 depicts that power management in ADNs can be operated effectively and efficiently among the dedicated formed groups.

Electric power systems may deliver power in one direction, where power is generated by fuel-based power plants in the macro grid, routed or switched through the transmission system, and ultimately distributed to the customers. Power balance may be managed by the central control center, which may ensure power generation at one end and power loads at the other end are balanced. When a household implements an on-location power generator (e.g., a PV solar system on its rooftop) and contributes its power surplus back to the grid, the reverse power can have effects on power management in the distribution network such as voltage control and power flow. Once the penetration level of on-location power generation systems escalates in a neighborhood, the variability of renewable generation and power consumption during each time interval may need to be monitored and controlled in order to maintain system stability. Every MG (or neighborhood) comprised of multiple households may be considered to be a grid entity that occasionally provides or absorbs a range of real and reactive power to or from other MGs. From a whole distribution network level perspective, the balance of power throughout the power system may be interpreted as follows:

$$P = \sum_{c \in C} P_c + P_{GEN} + P_{LOSS} \approx 0 \qquad [1]$$

where $P_c \in \mathbb{Z}$, $\forall c \in C$, is the output power of cluster c; $P_{GEN}$ is the total power generated in the macro grid and delivered to the clusters; and $P_{LOSS}$ is the total power loss during power transmission.

To determine the output power $P_c$, cumulative output power of each level throughout the ADNs may be determined in the following sequence:
  the output power of cluster c is the aggregation of power of groups, i.e., $P_c = \sum_{i=1}^{k} P_{g_i}$, $\forall c \in C$;
  the output power of group g is the aggregation of power of MGs, i.e., $P_g = \sum_{i=1}^{j} P_{h_i}$, $\forall g \in c$, $P_g \in \mathbb{Z}$;
  the output power of MG h is the aggregation of power of households, i.e., $P_h = \sum_{i=1}^{n} P_{v_i}$, $\forall h \in g$, $P_h \in \mathbb{Z}$;
  the output power of household (or corresponding bus) v is $P_v \in \mathbb{Z}$, where $\{v_1, v_2, \ldots, v_n\} \in V_h$, $\forall h \in g$, are the buses connected with associated households in the residential networks.

In the ADNs, power nodes (with communications interfaces), such as smart meters, inverters/converters, circuit breakers, line sensors, voltage regulators, and capacitor banks, may be assumed to be strategically deployed in positions such that the network connectivity is fulfilled. The OCNI model for the underlying ADNs, where the nodes are static and fixed, may be developed to facilitate both power flow and communications traffic management.

Figure 3:
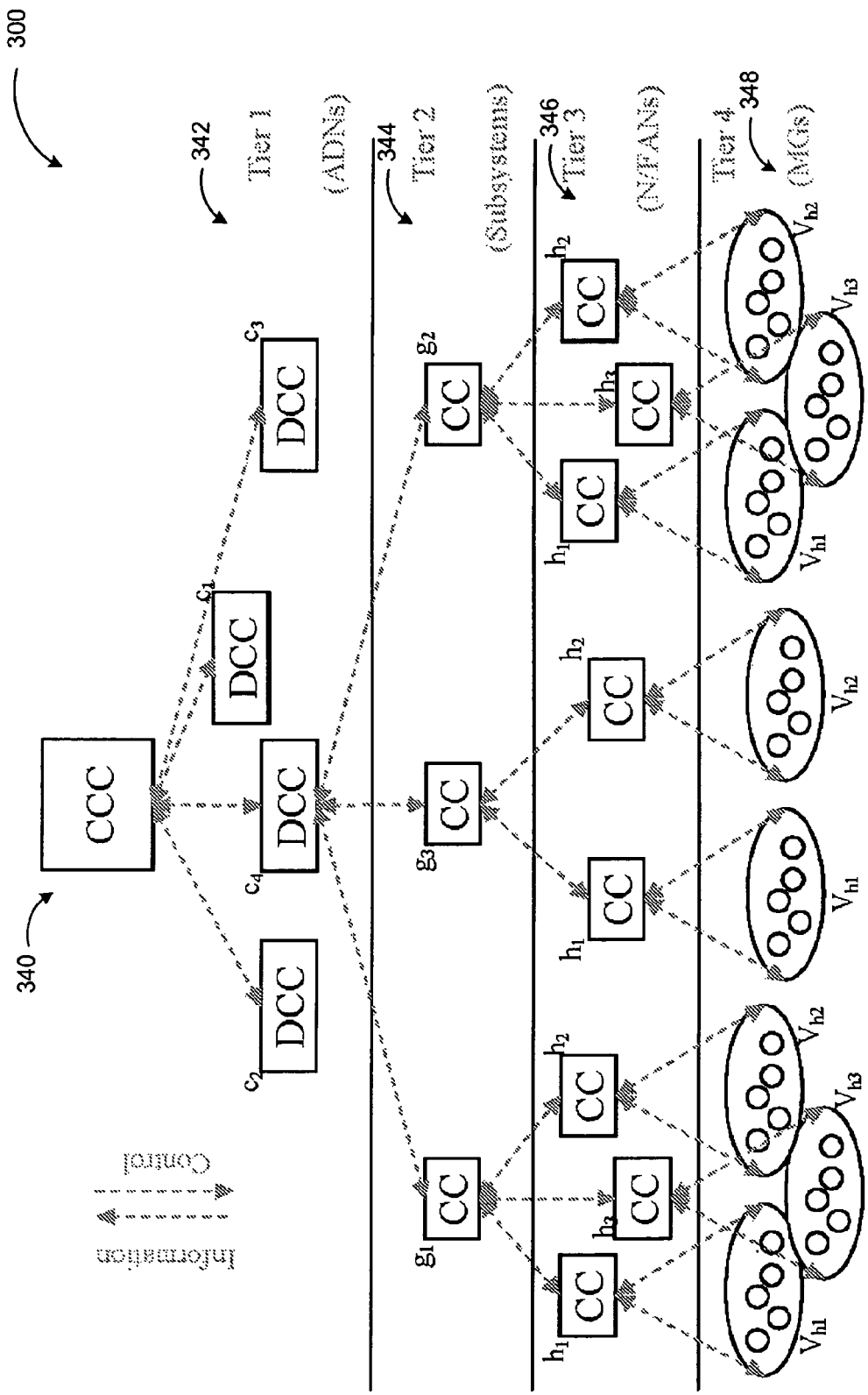
FIG. 3 illustrates a four-tier communications infrastructure for the underlying autonomous distribution network.

FIG. 3 illustrates a four-tier communications infrastructure for the underlying autonomous distribution network, arranged in accordance with at least some embodiments described herein.

Diagram 300 includes an example OCNI architecture layered into four tiers (342, 344, 346, and 348). Layer 342 represents tier 1, where the interconnection between the macro grid and the ADNs that establishes a core network (CN) resides. Layer 344 represents tier 2, where grouped subsystems reside in corresponding ADN that constructs a wide area network (WAN). Layer 346 represents tier 3, where coupled MGs belonging to the corresponding subsystem that creates a neighborhood/field area network (N/FAN) reside. Layer 348 represents tier 4, where joined households form in the corresponding MG that integrates local area networks (LANs) and home area networks (HANs).

The central control center (CCC) 340 owned by the transmission system operators (TSOs) in the transmission network may regulate power generation and load among ADNs using broadband communications technologies, for example. The distribution control centers (DCCs) supervised by distribution system operators (DSOs) at layer 342 may actively monitor and control power flow for the corresponding ADNs in association with the control centers (CCs) at layer 344 using wireless and/or fiber optic technologies, for example. The CCs at layer 346 may be associated with the CCs at layer 344 using wireless technologies. Finally, power nodes deployed at layer 348 may be associated with the CCs at layer 346 using wireless sensor networks (WSNs) technology via one-hop or multi-hop transmissions. Of course, other communication technologies may also be employed to interconnect various nodes of different layers.

In an uplink transmission, information composed of voltage profiles and associated data measurements may be collected from the nodes and delivered to the CCs at the upper tiers for local power flow analysis. In a downlink transmission, the associated CCs may send control signals to the nodes at lower tiers to adjust power output in order to optimize network resources while maintaining the system stability. The hierarchical OCNI architecture design with the grouping technique for ADNs may simplify control complexity and economize communications bandwidth at the upper tiers based on the determination that a system of many MGs may not need fast communication and redispatching power among MGs may not need detailed information on individual power units for the corresponding communications systems to deliver. In other words, real-time communications and detailed information on DER units and loads may be sufficient within MGs at layer 348 in order to achieve fast control of each individual power units.

Figure 4:
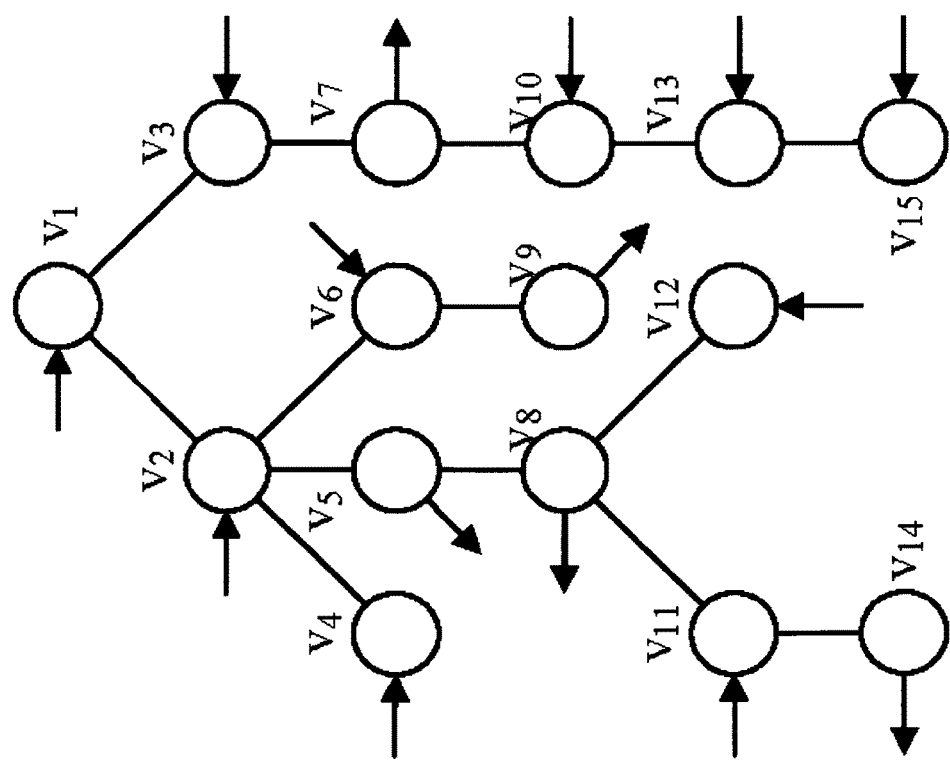
FIG. 4 illustrates a connected, undirected tree graph of the micro grid depicted in FIG. 1 with a set of injection of power generation and extraction of power loads.

FIG. 4 illustrates a connected, undirected tree graph of the micro grid depicted in FIG. 1 with a set of injection of power generation and extraction of power loads, arranged in accordance with at least some embodiments described herein.

When renewable resource appears to be abundant in some regions during sunny and/or windy days, the renewable energy production may be utilized and provided to others in-need instantly. Assuming that no large energy storage is implemented throughout the distribution grid, instant power sharing may be a potential and viable approach to minimization of power requested from the macro grid, i.e., $P_{GEN} = 0$. Therefore, the balance of power in Eq. [1] may be rewritten as:

$$P = \sum_{c \in C} P_c \approx 0 \qquad [2]$$

Equation [2] implies that the output power $P_c$ is effectively controlled, and $P_{LOSS}$ may be negligible as mentioned earlier. Neglecting power loss may overestimate the real values of output power of the coupled entities, and at the same time alter the final outcomes (e.g., power flow direction, macro grid power requirement). Nevertheless, to avoid requesting power from the macro grid by prioritizing renewable power sharing within MGs, among MGs in a group, among groups, and among ADNs in order to balance the power distribution system whenever possible, it may be assumed that renewable power generated in the distribution network is abundant, no energy storage is available to store the produced power, and the negligible power loss is compensated by controlling the production units and households' loads based on the output power of the entity.

To identify $P_c$, the cumulative output power of each MG at the bottom tier may be determined first. Following the example residential network for every MG as shown in FIG. 1, a connected, undirected tree graph $G=(V, E)$ with a set of vertices $v_1, v_2, \ldots, v_n \in V$ and a set of edges E may be considered as shown in diagram 400. In the tree graph of diagram 400, the vertices may represent buses connected with associated households where power can be injected, extracted, or injected and extracted simultaneously. Edges may represent line feeders between two buses. An assumption may be made that each household has installed a smart meter with a rooftop grid-tie PV system, for example. Each PV unit may generate an amount of power subject to weather conditions at different time periods. When solar production is adequate for the corresponding household's power consumption, there may be either a power surplus or no surplus flowed into the grid. On the other hand, inadequate production may necessitate additional power drawn from the bus.

To represent the above-discussed circumstances, each vertex (bus) may be injected or extracted (denoted by an arrow) with positive or negative power, $P_{v_i} \in \mathbb{Z}$, by household $v_i$. When $P_{v_i} > 0$, household $v_i$ may be considered to be a generating unit, whereas $P_{v_i} < 0$ indicates that household $v_i$ is a consuming unit. Meanwhile, household $v_i$ may be seen as an idle unit when $P_{v_i}$ approaches zero, i.e., balance of self-provision. It should be noted that the terms generation and production refer to power surplus, i.e., a total amount of pure generation of a PV system less household's consumption and inevitable losses (e.g., a loss during energy conversion and/or inversion).

Power flows from a higher voltage level to a lower voltage level as found in conventional power system networks. The variability of PV generation and households' loads may cause fluctuation in the voltage profiles of distribution networks, which may render the power flow management more challenging. Table 1 below illustrates that some households may inject power surpluses into the node (i.e., $v_1$-$v_4$, $v_6$, $v_{10}$-$v_{13}$, $v_{15}$) while others may consume power by extracting it from the node (i.e., $v_5$, $v_7$-$v_9$, $v_{14}$).

TABLE 1

Information and derived outcomes on the units from the digraph of the residential network depicted in diagram 400.

| Input | | | | Output | |
|---|---|---|---|---|---|
| $V^T$ | $D^T$ | $W^T$ | $P_V^T$ (kW) | E | f (v, w) (kW) |
| $v_1$ | 1 | $v_0$ | 6 | $(v_1, v_0)$ | 24 |
| $v_2$ | 2 | $v_1$ | 2 | $(v_2, v_1)$ | 7 |
| $v_3$ | 2 | $v_1$ | 1 | $(v_3, v_1)$ | 11 |
| $v_4$ | 3 | $v_2$ | 3 | $(v_4, v_2)$ | 3 |
| $v_5$ | 3 | $v_2$ | −1 | — | 0 |
| $v_6$ | 3 | $v_2$ | 4 | $(v_6, v_2)$ | 2 |
| $v_7$ | 3 | $v_3$ | −3 | $(v_7, v_3)$ | 10 |
| $v_8$ | 4 | $v_5$ | −6 | $(v_8, v_5)$ | 1 |
| $v_9$ | 4 | $v_6$ | −2 | $(v_6, v_9)$ | 2 |
| $v_{10}$ | 4 | $v_7$ | 6 | $(v_{10}, v_7)$ | 13 |
| $v_{11}$ | 5 | $v_8$ | 8 | $(v_{11}, v_8)$ | 4 |
| $v_{12}$ | 5 | $v_8$ | 3 | $(v_{12}, v_8)$ | 3 |
| $v_{13}$ | 5 | $v_{10}$ | 5 | $(v_{13}, v_{10})$ | 7 |
| $v_{14}$ | 6 | $v_{11}$ | −4 | $(v_{11}, v_{14})$ | 4 |
| $v_{15}$ | 6 | $v_{13}$ | 2 | $(v_{15}, v_{13})$ | 2 |

The cumulative output power of $v_1$ may be calculated and have a value of 24 kW in the example scenario of Table 1 (when power loss is not considered) based on the measured data collected from the smart meters and transmitted via communications at the instant. In order to balance the system, the surplus may be exported to the neighboring MGs in a reverse flow direction (a consuming case may result in a forward flow direction such that additional power has to be imported from the neighboring MGs to balance the system). However, power may flow in an undesirable direction due to power laws. For example 1p.u. (power unit) injected into $v_3$ may compensate for the load at $v_7$ in a forward direction or 2 p.u. injected into $v_2$ may compensate for the load at $v_5$ with a forward direction.

In order to improve the utilization of system resource, how power should flow throughout distribution networks may be determined in terms of power unit quantity and power flow direction. Voltage control algorithms using reactive power regulation approaches may be employed on control devices such as step voltage regulator (SVR) and static variable compensator (SVC) for that purpose.

For a radial tree-like topology, a bottom-up approach may be employed by using child-parent relationship (denoted by $W=w_1, w_2, \ldots, w_l$) as well as depth information (denoted by $D=1, 2, \ldots, d$), and computation may be started from the leaf node which has the largest depth value, i.e., the farthest node from the distribution transformer, according to some examples. The example given in FIG. 4 and Table 1 shows the tree may be branched into two: $v_2$ branch at the left and $v_3$ branch at the right. Algorithm 1 below describes an example process, which may be executed simultaneously in every MG at the bottom tier, and at the same time tailored for the operations at the upper tiers.

---

Algorithm 1 Control Of Power flow dirEction (COPE)

Initiation: Perform breadth-first search or depth-first search
to obtain the characteristics of an undirected graph G.
Input: A table containing $(V^T, D^T, W^T, P_V^T)$ information
is sorted in descending order of $D^T$.
Output: A digraph G presenting the direction and amount
of power flow, E and f(v, w).
$P_{W(V[n])} = 0$
for i = 1 to n do
    $P_{W(V[i])} \leftarrow P + P_{W(V[i])}$
    if $P_{V[i]} > 0$ then
        f (V [i], W (V [i])) = $P_{V[i]}$ {reverse flow}
        E ← (V[i], W (V [i]))
    end if
    if $P_{V[i]} < 0$ then
        f (W (V [i]), V [i]) = $P_{V[i]}$ {forward flow}
        E ← (W (V [i]), V [i])
    end if
end for

---

To address undesirable flow direction discussed above, the right branch may be analyzed as an example. The above-described COPE algorithm may indicate that the positive power of 2 p.u. injected into leaf node $v_{15}$ may flow in a reverse direction to its parent node $v_{13}$. An aggregate of 7 p.u. from the reverse power of $v_{15}$ and injected power of 5 p.u. by the associated household may flow in a reverse direction to the parent node $v_{10}$. The same process at $v_{10}$ with an aggregate of 13 p.u. flowed in a reverse direction may compensate for the load at the parent node $v_7$. The residual power of 10 p.u. from $v_7$ may flow in a reverse direction to aggregate with power generation at $v_3$. Notably, the edge between $v_3$ and $v_7$ may operate in a reverse mode instead of a forward mode. Applying a similar process to the left branch operation, the edge between $v_2$ and $v_5$ be found in an idle mode, i.e., no power flow may exist in this sectioned feeder.

The above-discussed example scenario shows an unbalanced situation in a MG, where renewable generation may be larger than households' consumption at the instant. Based on the business and utility operation criteria, the surplus may be (1) exported to other MGs throughout ADNs using the proposed COPE power sharing algorithm; (2) reduced to a balanced state by lowering the energy price via demand response programs to encourage energy utilization from households; and/or (3) resolved by disconnecting some of households' PV units from the grid to preclude surplus congestion. Similar to another unbalanced scenario where households' loads are greater than the amount of renewable energy being produced, the loads may be compensated by importing the surplus from other MGs, reduced by increasing energy price via demand response programs, or ultimately requesting power from the macro grid if necessarily.

In next-generation electric power systems, various smart grid applications are envisioned to employ a large amount of data measurement and collection not just to improve billing systems, but also to facilitate modernized controls and operations of power management with optimization techniques.

An example approach for interactive power control and communications management in ADNs is provided below in algorithm 2.

---

Algorithm 2 Power control and communications in ADNs

---

Require: All units are connected to the grid (in both power
 and communications perspectives).
Ensure: Periodic uplink and downlink data transmission be-
 tween Tier 4 and Tier 3.
 while power unbalance is discovered in a MG do
  if solutions provided in Sec. IV-B mitigate the problem
  then
   Power control and data communications remain in Tier
    4 and Tier 3.
  else {solutions do not effectively work}
   Power sharing with other MGs is necessary.
   Communications with CC at Tier 2 takes place.
   if the unbalance problem is still unsolved then
    Power sharing with other groups is necessary.
    Communications with DCC at Tier 1 takes place.
    if the unbalance problem still remains then
     Power sharing with other ADNs is necessary.
     Communications with CCC takes place.
     Power from macro grid is granted if needed;
     otherwise, disconnecting PV systems is required.
    end if
   end if
  end if
 end white

---

Data traffic conveyed in the smart grid may be grouped into two: uplink transmission and downlink transmission. The former delivers data information on the nodes periodically measured in MGs to the CCs at upper tiers. Through a number of processes of computation and decision making, the latter sends control messages back to the CCs and eventually the nodes at lower tiers to adjust output of renewable production and households' loads. Multi-tier OCNI for the underlying ADNs as exemplified in Algorithm 2 may mitigate heavy data traffic loads conveyed in the network.

The proposed COPE algorithm may adopt the power sharing approach by cooperatively compensating for power within MGs at the lower tiers, where the majority of data traffic is conveyed at the lower tiers. Detailed information and fast communications may not be needed at the upper tiers and data collected at tier 3 may be abstracted before transmission to the upper tier such that the abstracted data is sufficient for the operators at tier 2 to gain the knowledge of the underlying network status. In other words, the amount of data information to be transmitted to the CCs at upper tiers may be quantitatively defined by an abstraction ratio at which the information in uplink transmission is reduced, while power sharing among MGs, groups, ADNs is performed:

$$\text{Abstraction ratio} = \frac{\text{The amount of data that carries sufficient information to be transmitted to the upper tier}}{\text{The total amount of data information received from the lower tier}}$$

The abstraction ratio may range from 0 to 1. The ratio may be 1 if abstraction cannot be performed due to the requirement of detailed information for the control centers at the upper tier to operate. In contrast to the centralized scheme, the multi-tier OCNI for ADNs may mitigate heavy traffic loads by means of coarse-grained information delivered in the uplink transmission:

$$\alpha_i = \frac{L_{i\_(i-1)}}{L_{(i+1)\_i}}, i \in \{1, 2, 3\}, \quad [3]$$

where $\alpha_i$, is the abstraction ratio which depends on the operation requirement of the CCs at tier i (i.e., $0 < \alpha_i \leq 1$); $L_{(i+1)\_i}$ is the total amount of data received from tier (i+1), and $L_{i\_(i-1)}$ is the amount of data to be transmitted to the CC at tier (i−1).

For example, in the process of power balancing, the CC at tier 3 may need to acquire $L_{4\_3}$ amount of data from its associated power nodes in the MG in order to have a local knowledge of the network status while performing its operation. When the support of power sharing with neighboring MGs is needed (either power import or export), the CC at tier 3 may contact the associated CC at tier 2 by sending correlated information regarding its lower-tier network condition with its $L_{3\_2}$ amount of data, which is usually smaller than what it received, i.e., $L_{3\_2} < L_{4\_3}$; this may be because the tier-2 CC does not need to know everything about the network condition of tier-3 fully supervised by the tier-3 CC. It may be possible for the tier-3 CC to send a notification message (even abstract data may not be needed) to the tier-2 CC indicating how much power in total it has to export/import to/from the other MGs in order to support its power balance.

At a given time period, the uplink traffic loads performing information collection and downlink traffic loads administering control processes (which may often be broadcasts in nature) are described in Table 2 and Table 3, respectively, below.

TABLE 2

Description of presumptive traffic loads via uplink transmissions between adjacent tiers in OCNI.

| Tier Index | Amount of Traffic Load | Description |
|---|---|---|
| 4 to 3 | $L_{4\_3} = \bar{\lambda}_{N_h} N_h,$<br>$\forall h \in g,$<br>$\forall g \in c, \forall c \in C$ | This is where the fundamental power control and communications operations take place while each MG is governed by its associated Tier-3 CC simultaneously to monitor and control power flow individually. The number of households $|V_h|$ and other nodes $M_h$ (e.g., sensors along the feeders) that make the total power nodes $N_h = |V_h| \pm M_h$ in the corresponding MG are considered; the expected traffic arrival rate of these nodes is $\bar{\lambda}_{N_h}$. |
| 3 to 2 | $L_{3\_2} = \alpha_3 \sum_{j=1}^{|g|} \left( \bar{\lambda}_{N_{h_j}} N_{h_j} \right) + \bar{\lambda}_{M_g} M_g$<br>$\forall g \in c, \forall c \in C$ | This is where an aggregate of data traffic is collected from Tier-3 CCs and other measuring nodes $M_g$ in the corresponding group. The Tier-3 CCs will generate abstract data containing sufficient information on $|g|$ MGs status with $\alpha_3$ and transmit to the corresponding CC at Tier 2. |
| 2 to 1 | $L_{2\_1} = \alpha_2 \sum_{k=1}^{|c|} L_{3\_2,k} + \bar{\lambda}_{M_c} M_c$<br>$\forall c \in C$ | Similar to the above, an aggregate of data traffic is collected from Tier-2 CCs and other measuring nodes $M_c$ in the corresponding ADN. The Tier-2 CCs will generate abstract data containing sufficient information on $|c|$ groups status with $\alpha_2$ and transmit to the corresponding DCC. |
| 1 | $L_{1\_ccc} = \alpha_1 \sum_{s=1}^{|C|} L_{2\_1,s}$ | Similar to the above, an aggregate of data traffic is collected from Tier-1 DCCs. The Tier-1 DCCs will generate abstract data containing sufficient information on $|C|$ ADNs status with $\alpha_1$ and transmit to the CCC. |

TABLE 3

Description of presumptive traffic loads via downlink transmissions between adjacent tiers in OCNI.

| Tier Index | Amount of Traffic Load | Description |
|---|---|---|
| 3 to 4 | $L_{3\_4} = \bar{\lambda}_{3\_4} N_h,$<br>$\forall h \in g,$<br>$\forall g \in c, \forall c \in C$ | The fundamental level requires the CCs of N/FANs to send control messages to all the power nodes in the corresponding MGs; the expected traffic arrival rate of the CCs is $\bar{\lambda}_{3\_4}$ |
| 2 to 3 | $L_{2\_3} = \bar{\lambda}_{2\_3} (|g| + M_g),$<br>$\forall g \in c, \forall c \in C$ | Similar to the above, the CCs of subsystems send control messages to all the CCs and other measuring nodes $M_g$ in the corresponding N/FANs with the expected traffic arrival rate $\bar{\lambda}_{2\_3}$ |
| 1 to 2 | $L_{1\_2} = \bar{\lambda}_{1\_2} (|c| + M_c),$<br>$\forall c \in C$ | Similar to the above, the DCCs of ADNs send control messages to all the CCs and other measuring nodes $M_c$ in the corresponding subsystems with the expected traffic arrival rate $\bar{\lambda}_{1\_2}$ |
| 1 | $L_{ccc\_1} = \bar{\lambda}_{ccc\_1} |C|$ | Similar to the above, the CCC sends control messages to all the DCCs with the expected traffic arrival rate $\bar{\lambda}_{ccc\_1}$ |

Figure 5:
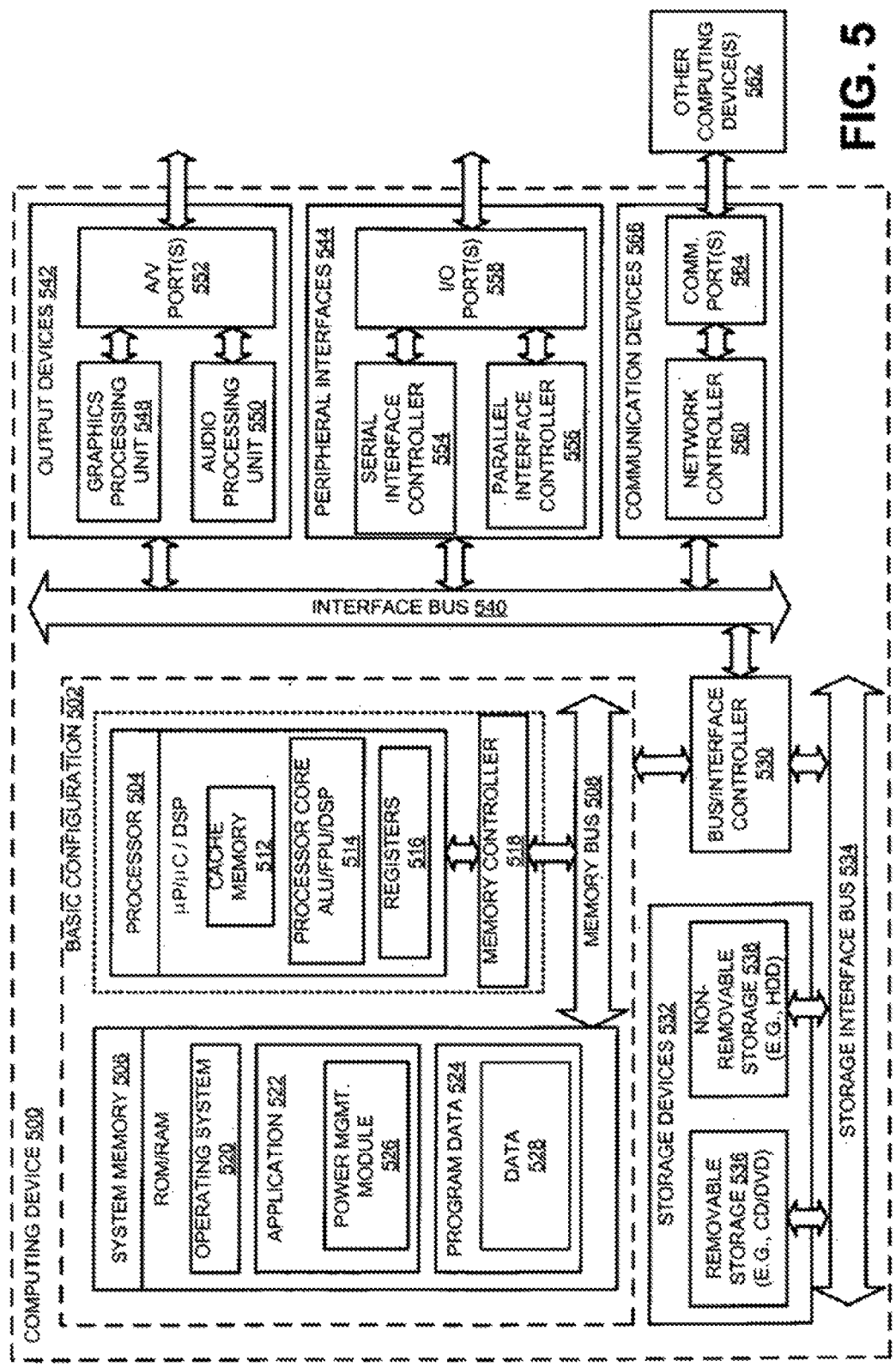
FIG. 5 illustrates a general purpose computing device, which may be used to manage decentralized controls and communications for autonomous distribution networks in a smart grid.

FIG. 5 illustrates a general purpose computing device, which may be used to manage decentralized controls and communications for autonomous distribution networks in a smart grid, arranged in accordance with at least some embodiments described herein.

For example, the computing device 500 may be used as a server, desktop computer, portable computer, smart phone, special purpose computer, or similar device such as a controller at a utility control center or a controller at a micro grid. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one or more levels of caching, such as a cache memory 512, one or more processor cores 514, and registers 516. The example processor cores 514 may (each) include an arithmetic logic unit (ALU), a floating point unit (FPU), a digital signal processing core (DSP core), or any combination thereof. An, example memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The application 522 may include a power management module 526, which may be an integral part of the application 522 or a separate application on its own. The power management module 526 may assist in a power balance implementation through power sharing (or redispatching) among micro grids before requesting power from the macro grid. Furthermore, enhancement of renewable energy utilization and reduction in the amount of data packet traffic may be accomplished in exchange of information and control messages via uplink and downlink transmissions throughout an overlay multi-tier communications network infrastructure, as described herein. The program data 524 may include, among other data, data 528 related to power consumption, power generation, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for maintaining application performances upon transfer between cloud servers. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
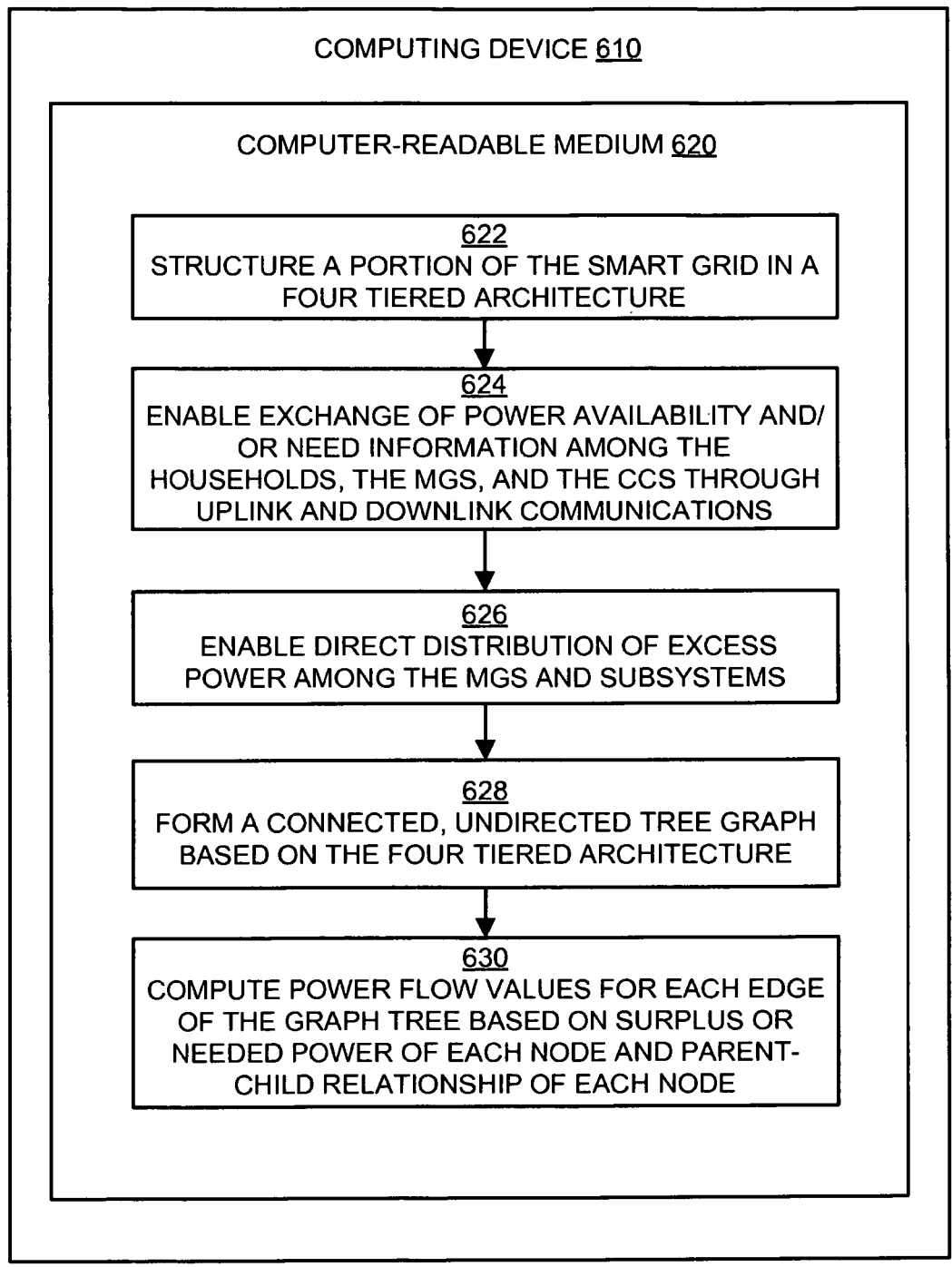
FIG. 6 is a flow diagram illustrating an example method that may be performed by a computing device such as the computing device in FIG. 5.

FIG. 6 is a flow diagram illustrating an example method that may be performed by a computing device such as the computing device in FIG. 5, arranged in accordance with at least some embodiments described herein.

Example methods may include one or more operations, functions or actions as illustrated by one or more of blocks 622, 624, 626, 628, and/or 630. The operations described in the blocks 622 through 632 may also be stored as computer-executable instructions in a computer-readable medium such as a computer-readable medium 620 of a computing device 610.

An example process for facilitating decentralized controls and communications for autonomous distribution networks in a smart grid may begin with block 622, "STRUCTURE A PORTION OF THE SMART GRID IN A FOUR TIERED ARCHITECTURE", where a smart network may be structured as shown in diagram 300 of FIG. 3. In the four-tiered architecture, a first tier may comprise a central control center (CCC) managing a plurality of Distribution Control Centers (DCCs) each DCC representing an Autonomous Distribution Network (ADN), a second tier may comprise a plurality of first Control Centers (CCs) each CC representing a subsystem, a third tier may comprise a plurality of second CCs each second CC representing neighborhood or a field area network, and a fourth tier may comprise a plurality of micro grids (MGs) each MG comprising one or more households and each MG being managed by a second CC in the third tier.

Block 622 may be followed by block 624, "ENABLE EXCHANGE OF POWER AVAILABILITY AND/OR NEED INFORMATION AMONG THE HOUSEHOLDS, THE MGS, AND THE CCS THROUGH UPLINK AND DOWNLINK COMMUNICATIONS", where power availability and/or need information may be exchanged via various communication networks between MGs, CCs, DCCs, and/or CCCs as shown in diagram 300 or FIG. 3.

Block 624 may be followed by block 626, "ENABLE DIRECT DISTRIBUTION OF EXCESS POWER AMONG THE MGS AND SUBSYSTEMS", where power imbalances within MGs, neighborhoods, substations, and/or ADNs may be corrected by enabling power flow from groups having power excess to groups having power need.

Block 626 may be followed by block 628, "FORM A CONNECTED, UNDIRECTED TREE GRAPH BASED ON THE FOUR TIERED ARCHITECTURE", where a tree graph based on the nodes of the network architecture may be formed such as tree graph 400 of FIG. 4 that indicates power flow directions.

Block 628 may be followed by block 630, "COMPUTE POWER FLOW VALUES FOR EACH EDGE OF THE GRAPH TREE BASED ON SURPLUS OR NEEDED POWER OF EACH NODE AND PARENT-CHILD RELATIONSHIP OF EACH NODE", where the power flows (based on surpluses and needs) may be computed as discussed herein.

The blocks included in the above described process are for illustration purposes. Decentralized controls and communications for autonomous distribution networks in a smart grid may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 7 illustrates a block diagram of an example computer program product, arranged in accordance with at least some embodiments described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, a power management module 526 executed on the processor 504 may undertake one or more of the tasks shown in FIG. 7 in response to the instructions 704 conveyed to the processor 504 by the signal bearing medium 702 to perform actions associated with decentralized controls and communications for autonomous distribution networks in a smart grid as described herein. Some of those instructions may include, for example, instructions for structuring a portion of the smart grid in a four tiered architecture; enabling exchange of power availability and/or need information among the households, the mgs, and the ccs through uplink and downlink communications; enabling direct distribution of excess power among the mgs and subsystems; forming a connected, undirected tree graph based on the four tiered architecture; and/or computing power flow values for each edge of the graph tree based on surplus or needed power of each node and parent-child relationship of each node according to some embodiments described herein.

In some implementations, the signal bearing medium 702 depicted in FIG. 7 may encompass a computer-readable medium 706, such as, but not limited to, a hard disk drive (HDD), a solid state drive (SDD), a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communication link, a wireless communication link, etc.). Thus, for example, the computer program product 700 may be conveyed to one or more modules of the processor 504 of FIG. 5 by an RF signal bearing medium, where the signal bearing medium 702 is conveyed by the wireless communications medium 710 (e.g., a wireless communications medium conforming with the IEEE 802.11 standard).

According to some example embodiments, various methods for managing power congestion conditions in a power grid through smart metering communications (SMC) are described. Example methods may include one or more of receiving energy profile information from a smart meter, where the smart meter is associated with a household; during a power congestion condition: maintaining the smart meter connected to the grid when the household is determined to have no power surplus, and disconnecting the smart meter from the grid and transitioning the smart meter into one of an islanded mode or a standby mode when the household is determined to have power surplus; and/or reconnecting the disconnected smart meter upon either detection of a need for grid power or expiration of the power congestion.

According to some example embodiments, various methods for facilitating decentralized controls and communications for autonomous distribution networks in a smart grid are described. Example methods may include structuring at least a portion of the smart grid in a four tiered architecture, where a first tier comprises a central control center (CCC) managing a plurality of Distribution Control Centers (DCCs) each DCC representing an Autonomous Distribution Network (ADN), a second tier comprises a plurality of first Control Centers (CCs) each CC representing a subsystem, a third tier comprises a plurality of second CCs each second CC representing neighborhood or a field area network, and a fourth tier comprises a plurality of micro grids (MGs) each MG comprising one or more households and each MG being managed by a second CC in the third tier. The example methods may also include enabling exchange of power availability and/or need information among the households, the MGs, and the CCs through uplink and downlink communications; and enabling direct distribution of excess power among the MGs and subsystems.

According to other examples, the method may include forming a connected, undirected tree graph based on the four tiered architecture, where each vertex of the tree graph represents a power distribution bus with associated households and each edge represents a line feeder with one of a power injection or a power extraction; designating a household a generating unit if $P_{vi}>0$ and a consuming unit if $P_{vi}<0$, where $P_{vi}$ is a power value associated with a household $v_i$ injecting or extracting power to or from the smart grid; and/or designating the household as an idle unit when $P_{vi}$ approaches about zero. Example methods may also include determining a child-parent relationship (W) and a depth (D) for each node of the tree graph; sorting the nodes of the graph tree in a descending order of the depth of each node; and computing power flow values for each edge of the graph tree based on surplus or needed power of each node and W of each node. The methods may further include starting the computation from a leaf node with a largest depth value or a farthest node from a distribution transformer.

According to further examples, the method may include if a power imbalance within an MG is balanceable by adjusting power flows among households of the same MG, limiting uplink and downlink communications to the third and fourth tiers as the power imbalance is corrected; if the power imbalance within the MG is not balanceable by adjusting power flows among households of the same MG, facilitating power sharing among two or more MGs by extending the uplink and downlink communications to the second tier as the power imbalance is corrected; if the power imbalance within the MG is not balanceable by power sharing among two or more MGs, facilitating power sharing among two or more substations by extending the uplink and downlink communications to the DCCs of the first tier as the power imbalance is corrected; and/or if the power imbalance within the MG is not balanceable by power sharing among two or more substations, facilitating power sharing among two or more ADNs by extending the uplink and downlink communications to the CCC of the first tier as the power imbalance is corrected.

According to yet other examples, the method may include as the uplink and downlink communications are extended to higher tiers, aggregating data collected from one or more of multiple MGs, multiple substations, and/or multiple ADNs at each tier, and abstracting the aggregated data for transmission to a controller in a higher tier. An amount of data to be transmitted to controller at higher tiers may be defined by an abstraction ratio at which information in an uplink transmission is reduced while power sharing among MGs, substations, and/or ADNs is performed. The abstraction ratio may be an amount of data that carries sufficient information to be transmitted to a higher tier divided by a total amount of data received from a lower tier.

According to yet further examples, the method may include facilitating uplink and downlink communications between the CCC and the DCCs via broadband communication networks; facilitating uplink and downlink communications between the DCCs and the CCs in the second tier via broadband cellular communication networks and fiber optic communication networks; facilitating uplink and downlink communications between the CCs in the second tier and the CCs in the third tier via cellular communication networks and wireless communication networks; and/or facilitating uplink and downlink communications between the CCs in the third tier and the MGs via wireless sensor networks (WSNs) employing one-hop or multi-hop transmissions. Each MG may integrate local area networks (LANs) and home area networks (HANs).

According to other example embodiments, a smart power distribution network configured to facilitate decentralized controls and communications for autonomous distribution networks is described. An example network may include a first tier that comprises a central control center (CCC) managing a plurality of Distribution Control Centers (DCCs) each DCC representing an Autonomous Distribution Network (ADN); a second tier that comprises a plurality of first Control Centers (CCs) each CC representing a subsystem; a third tier that comprises a plurality of second CCs each second CC representing neighborhood or a field area network; and/or a fourth tier that comprises a plurality of micro grids (MGs) each MG comprising one or more households and each MG being managed by a second CC in the third tier. The network may enable exchange of power availability and/or need information among the households, the MGs, and the CCs through uplink and downlink communications, and direct distribution of excess power among the MGs and subsystems.

According to other examples, a connected, undirected tree graph may be formed based on the four tiered architecture with each vertex of the tree graph representing a power distribution bus with associated households and each edge representing a line feeder with one of a power injection or a power extraction. A household may be designated a generating unit if $P_{vi}>0$ and a consuming unit if $P_{vi}<0$, where $P_{vi}$ is a power value associated with a household $v_i$ injecting or extracting power to or from the smart grid; and the household may be designated as an idle unit when $P_{vi}$ approaches about zero.

According to further examples, a child-parent relationship (W) and a depth (D) may be determined for each node of the tree graph; the nodes of the graph tree may be sorted in a descending order of the depth of each node; and power flow values may be computed for each edge of the graph tree based on surplus or needed power of each node and W of each node. The computation may be started from a leaf node with a largest depth value or a farthest node from a distribution transformer. Uplink and downlink communications may be limited to the third and fourth tiers as a power imbalance is corrected if the power imbalance within an MG is balanceable by adjusting power flows among households of the same MG.

According to yet other examples, power sharing may be facilitated among two or more MGs by extending the uplink and downlink communications to the second tier as the power imbalance is corrected if the power imbalance within the MG is not balanceable by adjusting power flows among households of the same MG; substations by extending the uplink and downlink communications to the DCCs of the first tier as the power imbalance is corrected if the power imbalance within the MG is not balanceable by power sharing among two or more MGs; and ADNs by extending the uplink and downlink communications to the CCC of the first tier as the power imbalance is corrected if the power imbalance within the MG is not balanceable by power sharing among two or more substations.

According to yet other examples, data collected from one or more of multiple MGs, multiple substations, and/or multiple ADNs may be aggregated at each tier, and the aggregated data abstracted for transmission to a controller in a higher tier as the uplink and downlink communications are extended to higher tiers. An amount of data to be transmitted to controller at higher tiers may be defined by an abstraction ratio at which information in an uplink transmission is reduced while power sharing among MGs, substations, and/or ADNs is performed. The abstraction ratio may be an amount of data that carries sufficient information to be transmitted to a higher tier divided by a total amount of data received from a lower tier. Uplink and downlink communications may be facilitated between the CCC and the DCCs via broadband communication networks; between the DCCs and the CCs in the second tier via broadband cellular communication networks and fiber optic communication networks; between the CCs in the second tier and the CCs in the third tier via cellular communication networks and wireless communication networks; and between the CCs in the third tier and the MGs via wireless sensor networks (WSNs) employing one-hop or multi-hop transmissions. Each MG may integrate local area networks (LANs) and home area networks (HANs).

According to further example embodiments, a computer readable storage medium with instructions stored thereon for executing a method at one or more processors for facilitating decentralized controls and communications for autonomous distribution networks in a smart grid is described. The instructions may include structuring at least a portion of the smart grid in a four tiered architecture, where a first tier comprises a central control center (CCC) managing a plurality of Distribution Control Centers (DCCs) each DCC representing an Autonomous Distribution Network (ADN), a second tier comprises a plurality of first Control Centers (CCs) each CC representing a subsystem, a third tier comprises a plurality of second CCs each second CC representing neighborhood or a field area network, and a fourth tier comprises a plurality of micro grids (MGs) each MG comprising one or more households and each MG being managed by a second CC in the third tier. The example instructions may also include enabling exchange of power availability and/or need information among the households, the MGs, and the CCs through uplink and downlink communications; and enabling direct distribution of excess power among the MGs and subsystems.

According to other examples, the instructions may include forming a connected, undirected tree graph based on the four tiered architecture, where each vertex of the tree graph represents a power distribution bus with associated households and each edge represents a line feeder with one of a power injection or a power extraction; designating a household a generating unit if $P_{vi}>0$ and a consuming unit if $P_{vi}<0$, where $P_{vi}$ is a power value associated with a household $v_i$ injecting or extracting power to or from the smart grid; and/or designating the household as an idle unit when $P_{vi}$ approaches about zero. Example instructions may also include determining a child-parent relationship (W) and a depth (D) for each node of the tree graph; sorting the nodes of the graph tree in a descending order of the depth of each node; and computing power flow values for each edge of the graph tree based on surplus or needed power of each node and W of each node. The instructions may further include starting the computation from a leaf node with a largest depth value or a farthest node from a distribution transformer.

According to further examples, the instructions may include if a power imbalance within an MG is balanceable by adjusting power flows among households of the same MG, limiting uplink and downlink communications to the third and fourth tiers as the power imbalance is corrected; if the power imbalance within the MG is not balanceable by adjusting power flows among households of the same MG, facilitating power sharing among two or more MGs by extending the uplink and downlink communications to the second tier as the power imbalance is corrected; if the power imbalance within the MG is not balanceable by power sharing among two or more MGs, facilitating power sharing among two or more substations by extending the uplink and downlink communications to the DCCs of the first tier as the power imbalance is corrected; and/or if the power imbalance within the MG is not balanceable by power sharing among two or more substations, facilitating power sharing among two or more ADNs by extending the uplink and downlink communications to the CCC of the first tier as the power imbalance is corrected.

According to yet other examples, the instructions may include as the uplink and downlink communications are extended to higher tiers, aggregating data collected from one or more of multiple MGs, multiple substations, and/or multiple ADNs at each tier, and abstracting the aggregated data for transmission to a controller in a higher tier. An amount of data to be transmitted to controller at higher tiers may be defined by an abstraction ratio at which information in an uplink transmission is reduced while power sharing among MGs, substations, and/or ADNs is performed. The abstraction ratio may be an amount of data that carries sufficient information to be transmitted to a higher tier divided by a total amount of data received from a lower tier.

According to yet further examples, the instructions may include facilitating uplink and downlink communications between the CCC and the DCCs via broadband communication networks; facilitating uplink and downlink communications between the DCCs and the CCs in the second tier via broadband cellular communication networks and fiber optic communication networks; facilitating uplink and downlink communications between the CCs in the second tier and the CCs in the third tier via cellular communication networks and wireless communication networks; and/or facilitating uplink and downlink communications between the CCs in the third tier and the MGs via wireless sensor networks (WSNs) employing one-hop or multi-hop transmissions. Each MG may integrate local area networks (LANs) and home area networks (HANs).

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those, skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures arc merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g.; "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g. "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to facilitate decentralized controls and communications for autonomous distribution networks in a smart grid, the method comprising:
   structuring at least a portion of the smart grid in a four tiered architecture, wherein:
      a first tier comprises a central control center (CCC) configured to manage a plurality of distribution control centers (DCCs), each DCC representative of an autonomous distribution network (ADN),
      a second tier comprises a plurality of first control centers (CCs), each first CC representative of a subsystem,
      a third tier comprises a plurality of second CCs, each second CC representative of a neighborhood or a field area network, and
      a fourth tier comprises a plurality of micro grids (MGs), each MG comprising, one or more households and each MG being managed by a second CC in the third tier;
   enabling exchange of power availability and/or need information among the one or more households, the plurality of MGs, and the plurality of first and second CCs through uplink and downlink communications;
   collecting data from the plurality of MGs, a plurality of substations, and/or a plurality of ADNs at each tier;
   aggregating the data collected from one or more of the plurality of MGs, the plurality of substations, and/or the plurality of ADNs at each tier,
   abstracting the aggregated data before transmission of the abstracted data to a higher tier, wherein abstracting the aggregated data comprises reducing the aggregated data into reduced data for transmission of the reduced data to a controller in the higher tier via the uplink and the downlink communications, and wherein an amount of the aggregated data to be reduced is quantitatively defined by an abstraction ratio at which information in the uplink communication is reduced while power sharing among the plurality of MGs, the plurality of substations, and/or the plurality of ADNs is performed; and
   controlling distribution of excess power among the plurality of MGs and a plurality of subsystems, while the abstracted data is transmitted to the higher tier.

2. The method according to claim 1, further comprising:
   forming a connected, undirected tree graph based on the four tiered architecture, wherein each vertex of the tree graph represents a power distribution bus with associated households and each edge represents a line feeder with one of a power injection or a power extraction.

3. The method according to claim 2, further comprising:
   designating a household $v_i$ as, a generating unit if $P_{vi}>0$ and as a consuming unit if $P_{vi}<0$, wherein $P_{vi}$ is a power value associated with the household $v_i$ injecting or extracting power to or from the smart grid; and
   designating the household $v_i$ as an idle unit when $P_{vi}$ approaches about zero.

4. The method according to claim 2, further comprising:
   determining a child-parent relationship (W) and a depth (D) for each node of the tree graph;
   sorting nodes of the time graph in a descending order of the depth of each node; and
   computing power flow values flow for each edge of the tree graph based on surplus or needed power of each node and the W of each node.

5. The method according to claim 4, wherein:
   computing the power flow values includes starting computation from a leaf node with a largest depth value or a farthest node from a distribution transformer.

6. The method according, to claim 1, further comprising:
   if a power imbalance within an MG is balanceable by adjusting power flows among households of the MG, limiting the uplink and downlink communications to the third tier and the fourth tier as the power imbalance is corrected.

7. The method according to claim 6, further comprising:
   if the power imbalance within the MG is not balanceable by adjusting the power flows among the households of the MG, facilitating power sharing among two or more MGs by extending the uplink and downlink communications to the second tier as the power imbalance is corrected.

8. The method according to claim 7, further comprising:
   if the power imbalance within the MG is not balanceable by the power sharing among the two or more MGs, facilitating power sharing among two or more substations by extending the uplink and downlink communications to the plurality of DCCs of the first tier as the power imbalance is corrected.

9. The method according to claim 8, further comprising:
   if the power imbalance within the MG is not balanceable by the power sharing among the two or more substations, facilitating power sharing among two or more ADNs by extending the uplink and downlink communications to the CCC of the first tier as the power imbalance is corrected.

10. The method according to claim 1, wherein the abstraction ratio is an amount of data that carries sufficient information to be transmitted to the higher tier divided by a total amount of data received from a lower tier.

11. A smart power distribution network configured to facilitate decentralized controls and communications for autonomous distribution networks, the smart power distribution network comprising:

a first tier that comprises a central control center (CCC) configured to manage a plurality of distribution control centers (DCCs), each DCC representative of an autonomous distribution network (ADN);

a second tier that comprises a plurality of first control centers (CCs), each first CC representative of a subsystem;

a third tier that comprises a plurality of second CCs, each second CC representative of a neighborhood or a field area network; and a fourth tier that comprises a plurality of micro grids (MGs), wherein each MG comprises one or more households and each MG is managed by a second CC in the third tier, and wherein the smart power distribution, network is configured to:

exchange of power availability and/or need information among the one or more households, the plurality of MGs, and the plurality of first and second CCs through uplink and downlink communications;

enable collection of data from the plurality of MGs, a plurality of substations, and/or a plurality of ADNs at each tier;

enable aggregation of the data collected from one or more of the plurality of MGs, the plurality of substations, and/or the plurality of ADNs at each tier;

enable abstraction of the aggregated data before transmission of the abstracted data to a higher tier, wherein the abstraction of the aggregated data comprises reduction of the aggregated data into reduced data for transmission of the reduced data to a controller in the higher tier via the uplink and downlink communications, and wherein an amount of the aggregated data to be reduced is quantitatively defined by an abstraction ratio at which the information in the uplink communication is reduced; and control distribution of excess power among the plurality of MGs and a plurality of subsystems, while the abstracted data is transmitted to the higher tier.

12. The smart power distribution network according to claim 11, wherein the uplink and downlink communications are limited to the third tier and fourth tier as a power imbalance is corrected, if the power imbalance within an MG is balanceable by adjustment of power flows among households of the MG.

13. The smart power distribution network according to claim 12, wherein power sharing is facilitated among two or more:

MGs by extension of the uplink and downlink communications to the second tier as the power imbalance is corrected if the power imbalance within the MG is not balanceable by adjustment of the power flows among the households of the MG;

substations by extension of the uplink and downlink communications to the plurality of DCCs of the first tier as the power imbalance is corrected, is the power imbalance within the MG is not balanceable by power sharing among the two or more MGs; and ADNs by extension of the uplink and downlink communications to the CCC of the first tier as the power imbalance is corrected, if the power imbalance within the MG is not balanceable by the power sharing among two or more substations.

14. The smart power distribution network according to claim 11, wherein uplink and downlink communications are facilitated:

between the CCC and the plurality of DCCs via broadband communication networks;

between the plurality of DCCs and the plurality of first CCs in the second tier via broadband cellular communication networks and fiber optic communication networks;

between the plurality of first CCs in the second tier and the plurality of second CCs in the third tier via cellular communication networks and wireless communication networks; and between the plurality of second CCs in the third tier and the plurality of MGs via wireless sensor networks (WSNs) configured to employ one-hop or multi-hop transmissions.

15. The smart power distribution network according to claim 11, wherein each MG is configured to integrate local area networks (LANs) and home area networks (HANs).

16. The smart power distribution network according to claim 11, wherein the information in the uplink communication is reduced in accordance with the abstraction ratio while power sharing among the plurality of MGs, the plurality of substations, and/or the plurality of ADNs is performed.

17. A non-transitory computer readable storage medium with instructions stored thereon that are executable by one or more processors to facilitate decentralized controls and communications for autonomous distribution networks in a smart grid, the instructions being executable to perform or cause to be performed:

managing operation of at least a portion of the smart grid that has been structured in a four tiered architecture, wherein:

a first tier comprises a central control center (CCC) that manages a plurality of distribution control centers (DCCs), each DCC representative of an autonomous distribution network (ADN), a second tier comprises a plurality of first control centers (CCs), each first CC representative of a subsystem, a third tier comprises a plurality of second CCs, each second CC representative of a neighborhood or a field area network, and a fourth tier comprises a plurality of micro grids (MGs), each MG comprising one or more households and each MG being managed by a second CC in the third tier;

enabling exchange of power availability and/or need information among the one or more households, the plurality of MGs, and the plurality of first and second CCs through uplink and downlink communications;

collecting data from the plurality of MGs, a plurality of substations, and/or a plurality of ADNs sat each tier;

aggregating the data collected from one or more of the plurality of MGs, the plurality of substations, and/or the plurality of ADNs at each tier;

abstracting the aggregated data before transmission of the abstracted data to a higher tier, wherein abstracting the aggregated data comprises reducing the aggregated data into reduced data for transmission of the reduced data to a controller in the higher tier via the uplink and the downlink communications, wherein an amount of the aggregated data to be transmitted to the controller in the higher tier is defined by an abstraction ratio at which information in the uplink communication is reduced while power sharing among the plurality of MGs, the plurality of substations, and/or the plurality of ADNs is performed; and controlling distribution of excess power among the plurality of MGs and a plurality of subsystems, while the abstracted data is transmitted to the higher tier.

18. The non-transitory computer readable storage medium according to claim 17, wherein the instructions are further executable to perform or cause to be performed:
forming a connected, undirected tree graph based on the four tiered architecture, wherein each vertex of the tree graph represents a power distribution bus with associated households and each edge represents a line feeder with one of a power injection or a power extraction.

19. The non-transitory computer readable storage medium according to claim 18, wherein the instructions are further executable to perform or cause to be performed:
designating a household $v_i$ as a generating unit if $P_{vi}>0$ and as a consuming unit if $P_{vi}<0$, wherein $P_{vi}$ is a power value associated with the household $v_i$ injecting, or extracting power to or from the smart grid; and
designating the household $v_i$ as an idle unit when $P_{vi}$ approaches about zero.

20. The non-transitory computer readable storage medium according to claim 18, wherein the instructions are further executable to perform or cause to be performed:
determining a child-parent relationship (W) and a depth (D) for each node of the tree graph;
sorting the nodes of the tree graph in a descending order of the depth of each node; and
computing power flow values for each edge of the tree graph based on surplus or needed power of each node and the W of each node.

21. The non-transitory computer readable storage medium according to claim 20, wherein the instructions are executable to perform or cause to be performed:
starting the computation from a leaf node with a largest depth value or a farthest node from a distribution transformer.

22. The non-transitory computer readable storage medium according to claim 17, wherein the instructions are further executable to perform or cause to be performed:
if a power imbalance within an MG is balanceable by adjusting power flows among households of the MG, limiting the uplink and downlink communications to the third tier and the fourth tier as the power imbalance is corrected.

23. The non-transitory computer readable storage medium according to claim 22, wherein the instructions are further executable to perform or cause to be performed:
if the power imbalance within the MG is not balanceable:
by adjusting the power flows among the households of the MG, facilitating power sharing among two or more MGs by extending the uplink and downlink communications to the second tier as the power imbalance is corrected;
by the power sharing among the two or more MGs, facilitating power sharing among two or more substations by extending the uplink and downlink communications to the plurality of DCCs of the first tier as the power imbalance is corrected, and
by the power sharing among the two or more substations, facilitating power sharing among two or more ADNs by extending the uplink and downlink communications to the CCC of the first tier as the power imbalance is corrected.

\* \* \* \* \*

UNITED STATES PATENT AND TRADEMARK OFFICE
CERTIFICATE OF CORRECTION

| | |
|---|---|
| PATENT NO. | : 9,804,623 B2 |
| APPLICATION NO. | : 14/342191 |
| DATED | : October 31, 2017 |
| INVENTOR(S) | : Ansari et al. |

It is certified that error appears in the above-identified patent and that said Letters Patent is hereby corrected as shown below:

In the Specification

In Column 1, Line 17, insert -- Unless otherwise indicated herein, the materials described in this section are not prior art to the claims in this application and are not admitted to be prior art by inclusion in this section. --.

In Column 2, Line 12, delete "Authnomous" and insert -- Autonomous --, therefor.

In Column 2, Line 62, delete "arc," and insert -- are, --, therefor.

In Column 3, Line 36, delete "alfa," and insert -- alia, --, therefor.

In Column 4, Line 54, delete "balancing. in" and insert -- balancing in --, therefor.

In Column 8, Line 40, delete "P +" and insert -- $Pv_{(i)}$ + --, therefor.

In Column 9, Line 58, delete "white" and insert -- while --, therefor.

In Column 12, Line 66, delete "An, example" and insert -- An example --, therefor.

In Column 16, Line 7, delete "(SDD)," and insert -- (SSD), --, therefor.

In Column 17, Line 30, delete "arc" and insert -- are --, therefor.

In Column 20, Line 39, delete "arc" and insert -- are --, therefor.

In Column 21, Line 63, delete "arc" and insert -- are --, therefor.

In Column 22, Line 56, delete "(e.g." and insert -- (e.g., --, therefor.

Signed and Sealed this
Thirty-first Day of July, 2018

Andrei Iancu
*Director of the United States Patent and Trademark Office*

CERTIFICATE OF CORRECTION (continued)
U.S. Pat. No. 9,804,623 B2

In the Claims

In Column 23, Line 48, in Claim 1, delete "comprising, one" and insert -- comprising one --, therefor.

In Column 23, Line 59, in Claim 1, delete "tier," and insert -- tier; --, therefor.

In Column 24, Line 15, in Claim 3, delete "as, a" and insert -- as a --, therefor.

In Column 24, Line 24, in Claim 4, delete "time graph" and insert -- tree graph --, therefor.

In Column 24, Line 26, in Claim 4, delete "values flow for" and insert -- values for --, therefor.

In Column 24, Line 33, in Claim 6, delete "according, to" and insert -- according to --, therefor.

In Column 25, Lines 14-15, in Claim 11, delete "distribution, network" and insert -- distribution network --, therefor.

In Column 25, Line 50, in Claim 13, delete "corrected if" and insert -- corrected, if --, therefor.

In Column 25, Line 55, in Claim 13, delete "is the" and insert -- if the --, therefor.

In Column 25, Line 64, in Claim 14, delete "wherein uplink" and insert -- wherein the uplink --, therefor.

In Column 25, Line 67, in Claim 14, delete "networks:" and insert -- networks; --, therefor.

In Column 26, Line 52, in Claim 17, delete "sat" and insert -- at --, therefor.

In Column 27, Line 16, in Claim 19, delete "injecting, or" and insert -- injecting or --, therefor.

In Column 28, Line 26, in Claim 23, delete "corrected, and" and insert -- corrected; and --, therefor.